United States Patent [19]
Ashbrook

[11] 4,041,823
[45] Aug. 16, 1977

[54] GUARD FOR SLITTING WHEEL

[75] Inventor: Walter L. Ashbrook, Fairfield, Ohio

[73] Assignee: Champion International Corporation, Stamford, Conn.

[21] Appl. No.: 666,437

[22] Filed: Mar. 12, 1976

[51] Int. Cl.² .......................................... B26D 7/22
[52] U.S. Cl. ..................................... 83/478; 83/546
[58] Field of Search .......... 83/478, 546, 545, DIG. 1; 74/609; 30/390, 391; 51/269, 272

[56] References Cited
U.S. PATENT DOCUMENTS

| | | | |
|---|---|---|---|
| 1,440,616 | 1/1923 | Mikshel | 83/478 X |
| 1,817,481 | 8/1931 | Fairchild | 83/478 |
| 2,441,378 | 5/1948 | Zielinski | 83/478 X |
| 3,135,049 | 6/1964 | Daugherty et al. | 83/478 X |

Primary Examiner—Frank T. Yost
Attorney, Agent, or Firm—Evelyn M. Sommer

[57] ABSTRACT

A two section guard for enclosing the upper and lower parts of a slitting wheel designed to slit continuously moving tapes of material such as paper, cloth, and plastic film. The slitting wheel extends through the bottom portion of the lower guard only far enough to engage the tape and a backup shear wheel. The lower portion of the guard is slotted for adjustment to accommodate slitting wheels of varying diameters.

11 Claims, 10 Drawing Figures

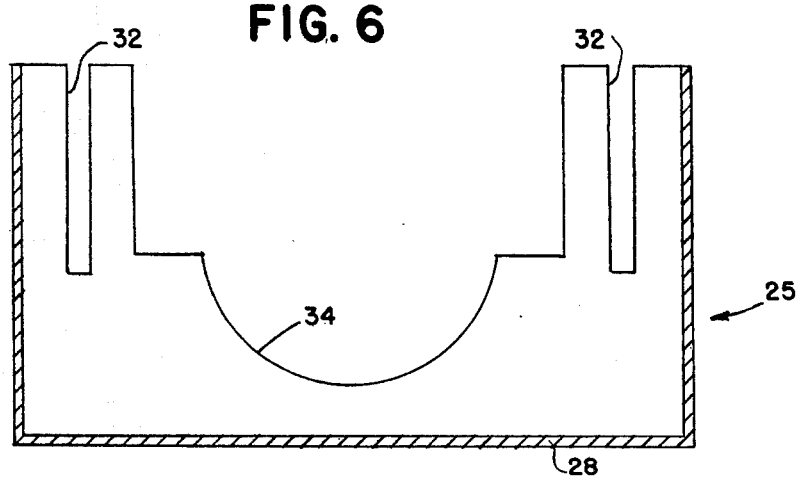
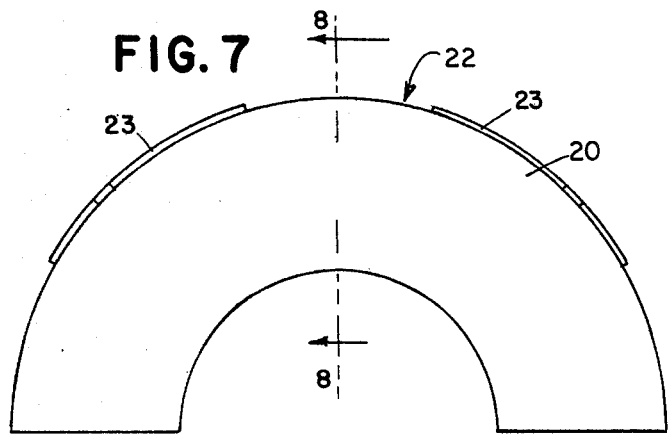
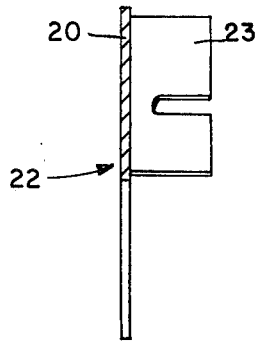
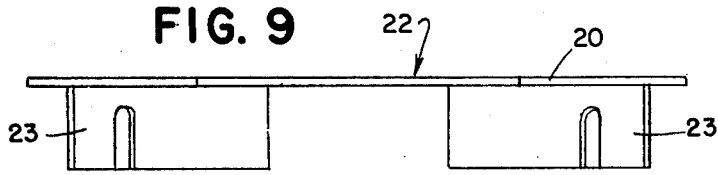
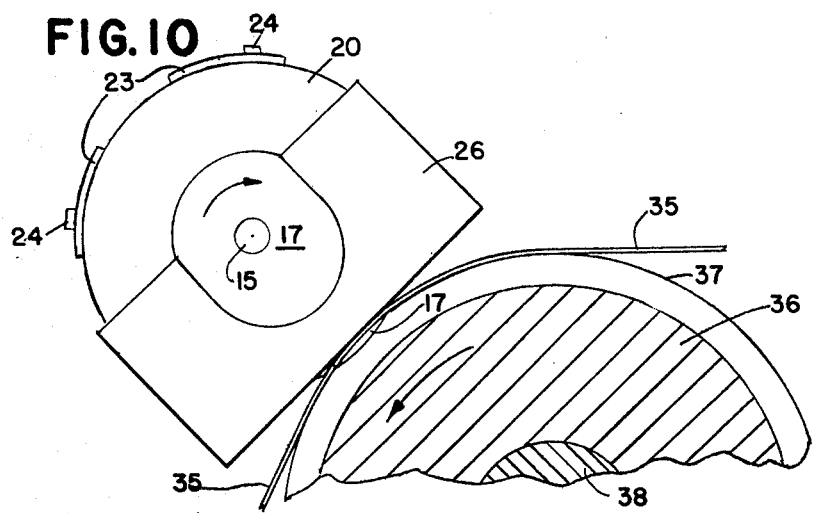

GUARD FOR SLITTING WHEEL

BACKGROUND OF THE INVENTION

Guards to protect workmen from rotating machinery are quite old in the art and have been considered necessary especially when the moving components include sharp edges. However, some guards are cumbersome, take up considerable space, and often make the operation of the machinery more difficult to control and adjust. The present invention employs two guard portions, one of which is easily adjustable, and when both are properly installed and in operating condition, the worker is fully protected.

One of the features of the invention is the novel means of mounting the guard components. The guard arrangement is coupled to the shaft which powers the slitting cutter so that the cutter wheel, the guard, and the shaft may all be adjusted as a single unit to mesh with the shear wheel.

SUMMARY

The invention comprises a guard for a rotatable slitting wheel mounted on a base and comprises an upper guard portion including a semicircular wall positioned parallel to the side of the slitting wheel. The wall is formed integral with two bent-over tabs for attachment to a portion of the base. A lower guard portion includes two walls positioned on either side of the slitting wheel and joined at their lower edges by a horizontal guard plate. The horizontal plate is formed with a slot at its central portion through which the edge of the slitting wheel extends for a short distance.

Additional details of the invention will be disclosed in the following description, taken in connection with the accompanying drawings.

BRIEF DESCRIPTION OF THE FIGURES

FIG. 6 is a cross sectional view of the lower portion shown in FIG. 3 and is taken along line 6 — 6 of that figure.

FIG. 7 is an end view of the upper portion of the guard.

FIG. 8 is a cross sectional view of the guard shown in FIG. 7 and is taken along line 8 — 8 of that figure.

FIG. 9 is a plan view of the upper portion of the guard showing the bent-over tabs.

FIG. 10 is an end view of the slitting wheel with its two guard portions mounted on a supporting roller (shown in section) and slitting a tape.

DESCRIPTION OF THE PREFERRED EMBODIMENT

Figure 1:
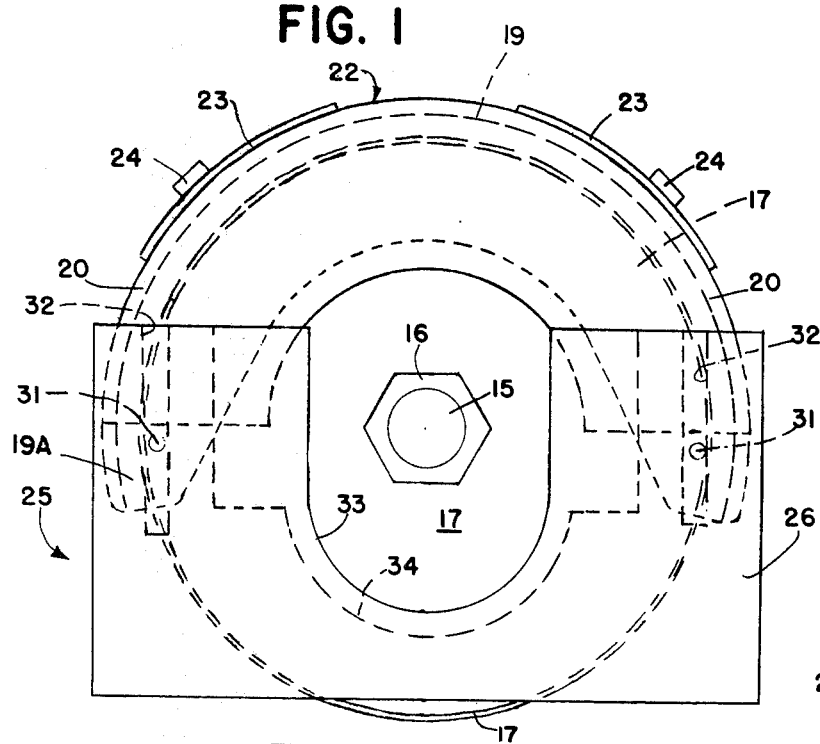
FIG. 1 is an end view of the slitting wheel array showing both portions of the guard, the slitting wheel, and the shaft on which the wheel is mounted.
Figure 2:
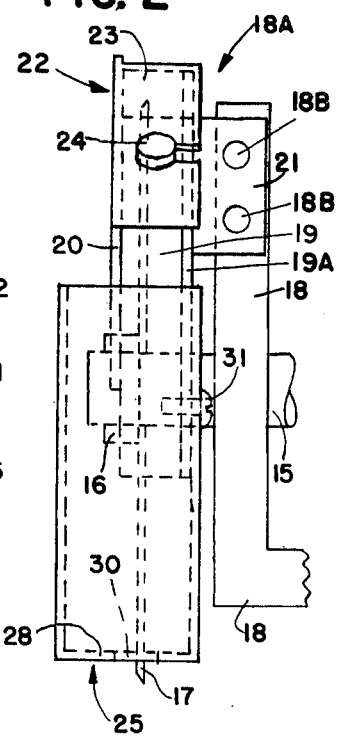
FIG. 2 is a side view of the wheel array shown in FIG. 1.
Figure 3:
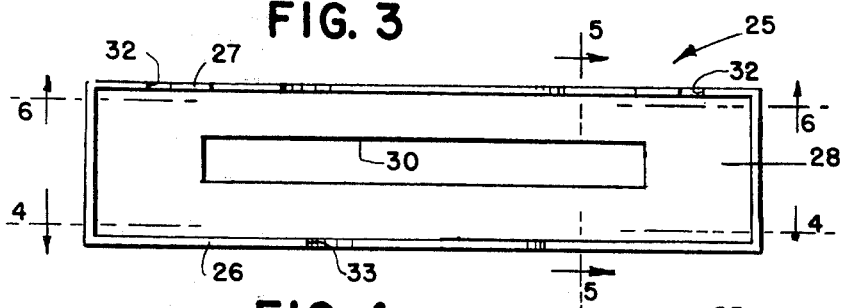
FIG. 3 is a top view of the lower portion of the guard.
Figure 4:
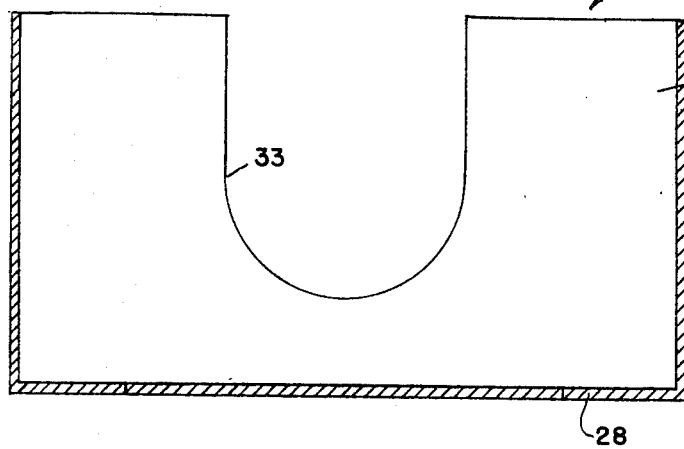
FIG. 4 is a cross sectional view of the lower portion shown in FIG. 3 and is taken along line 4 — 4 of that figure.
Figure 5:
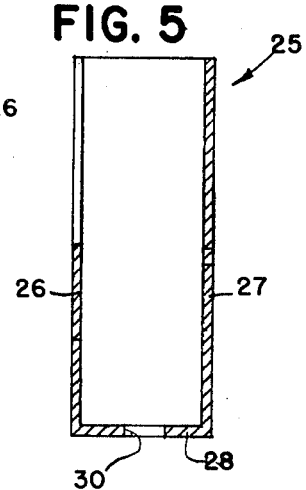
FIG. 5 is a cross sectional view of the lower portion shown in FIG. 3 and is taken along line 5 — 5 of that figure.

FIG. 1 shows the mounting shaft 15, a securing nut 16, and slitting wheel 17. The shaft 15 is driven by frictional engagement with the shearing wheel (not shown) and is rotatably mounted in a base portion 18 (see FIG. 2). A secondary base portion 18A is coupled to the base by bolts 18B and forms the supporting structure for holding both upper and lower portions 22 and 25, respectively, of the guard. The secondary base 18A includes a wall 19A located parallel with the plane of and between slitting wheel 17 and the base 18, a thick hemispheric flange plate 19, and an integral extension 21 which is secured to the base 18, as described above and shown in FIG. 2.

The wheel guard is formed of two portions, the upper portion 22, which comprises a single preferably semicircular wall 20 and two bentover portions 23 (see FIGS. 7 - 9). This upper portion is coupled to the base by bolts 24 threaded into flange plate 19 through the slots in bentover portions 23.

As shown in FIGS. 3 - 6, the lower guard portion 25 comprises two walls 26 and 27, positioned on either side of the slitting wheel and parallel to its faces. The walls 26 and 27 are joined at their lower edges by a horizontal guard plate 28 formed with a slot 30. The slitting wheel 17 extends a short distance, about one-quarter inch (6.35mm), through slot 30 with just enough cutting edge to give a satisfactory slitting action.

The lower guard portion 25 is coupled to base 18 by means of threaded screws 31 through the sides of a pair of vertical slots 32 formed in the wall 27 and into holes in wall 19A of secondary base 18A. The slots 32 permit an adjustment in the height of the lower portion 25 and provide a variation for size of slitting wheel and variation in its size due to repeated sharpening. Both upper and lower guard portions 22 and 25 are formed with U-shaped central cut-out openings 33 and 34 to permit access to the nut 16 and to make room for shaft 15.

When the upper and lower portions 22, 25 of the guard are assembled as shown in FIG. 1, all of the slitting wheel 17 is enclosed except for the central area adjoining the nut 16 and a very small portion extending through the lower slot 30. This type of enclosure protects a worker and permits adjustment of the device without danger to personnel.

One of the operating positions of the slitting wheel is shown in FIG. 10 where a tape or film 35 is fed over a shear roller 36 having a shearing edge 37 and turning around a shaft 38. The slitting wheel 17 is mounted with its cutting edge adjoining the shearing edge 37 or roller 36 and cuts the tape or film, producing two tapes when the tape leaves the roller 36. The slitting or cutting action is done entirely by the wheel 17; the shearing edge 37 need not be sharp and requires no sharpening operation. It acts only as a back-up surface to hold the film in place while being slit.

Accordingly, there is provided a new and improved guard for a slitting wheel so as to make the slitter wheel completely inaccessible to the operator yet still leave it properly engaged with the bottom slitter roll or wheel to give a good shear cut. The guard of the subject invention is simple in design, consisting of two pieces held in place by four set screws. The guard is easy to install and adjust, presents no operating problems, and most importantly, almost eliminates the possibility of an operator accidentally getting caught in the slitter and injured.

As is readily apparent, various modifications, adaptations, and variations of the subject structure may be effected by those skilled in the art without departing from the spirit of the invention. Hence the scope of the invention should be defined and limited only by the following claims.

What is claimed is:

1. A guard for rotatable slitting wheel mounted on a base comprising:
   a. an upper guard portion including a wall positioned parallel to said wheel and formed integral with two bent-over tabs for attachment to a portion of the base; and,
   b. a lower guard portion including two walls positioned on either side of said wheel, joined at their lower edges by a horizontal guard plate; said guard formed with a slot through which the edge of the slitting wheel extends;
   c. said lower guard portion also formed with vertical slots in one of said walls for adjustably securing the lower guard to the base.

2. A guard as claimed in claim 1 wherein said wall has a diameter greater than the diameter of the slitting wheel and said bent-over tabs are enclosing edge portions of the wheel.

3. A guard as claimed in claim 2 wherein said bent-over tabs are formed with slots for adjustable attachment to a portion of the base.

4. A guard as claimed in claim 1 wherein both the upper and lower guard walls are formed with cut out portions adjacent the central area of the wheel for providing space for a mounting shaft and providing access to a fastening means which secures the wheel to the shaft.

5. A guard as claimed in claim 1 wherein said lower guard is secured to a portion of the base by at least two bolts engaging said slots and a threaded hole in the base.

6. A guard as claimed in claim 1 wherein the slot in the horizontal portion of the lower guard is long enough to permit at least one quarter of an inch (6.35 mm.) of the edge of the slitting wheel to extend therethrough.

7. A guard for a rotatable slitter wheel mounted on a base comprising an upper guard portion having a semicircular wall disposed parallel to the plane of the wheel, said wall being secured to a portion of said base, and a lower guard portion including two walls respectively disposed on opposite sides of said wheel, and a horizontal guard plate joining said two walls, said lower horizontal guard plate formed with a slot through which the edge of the slitting wheel extends.

8. A guard as claimed in claim 7 wherein said lower guard portion is also formed with vertical slots in one of said walls for adjustably securing the lower guard to the base.

9. A guard for a rotatable slitting wheel mounted on a base comprising a first guard portion including a wall disposed parallel to said wheel, means for attaching said guard to said base, a second guard portion including two walls respectively disposed on opposite sides of said wheel, said two walls being joined at their lower edges by a horizontal guard plate formed with a slot through which the edge of the slitting wheel extends 10. A guard as claimed in claim 7 wherein said upper guard portion is formed with bent-over tabs for attachment to a portion of the base.

11. A guard as claimed in claim 9 wherein said tabs are formed with slots for adjustable attachment to the base.

* * * * *